No. 837,008. PATENTED NOV. 27, 1906.
G. H. STEWART.
MACHINE FOR FORMING CAN BODIES.
APPLICATION FILED JULY 28, 1905.

8 SHEETS—SHEET 1.

Attest
C. S. Middleton
Edward N. Saxton

Inventor
George H. Stewart
By Spear, Middleton, Donaldson & Spear
Attys.

No. 837,008. PATENTED NOV. 27, 1906.
G. H. STEWART.
MACHINE FOR FORMING CAN BODIES.
APPLICATION FILED JULY 28, 1905.

6 SHEETS—SHEET 2.

Attest
C. S. Middleton
Edward N. Santos

Inventor
George H. Stewart
by Spear, Middleton, Donaldson & Spear
Attys.

No. 837,008. PATENTED NOV. 27, 1906.
G. H. STEWART.
MACHINE FOR FORMING CAN BODIES.
APPLICATION FILED JULY 28, 1905.

8 SHEETS—SHEET 3.

No. 837,008. PATENTED NOV. 27, 1906.
G. H. STEWART.
MACHINE FOR FORMING CAN BODIES.
APPLICATION FILED JULY 28, 1905.

8 SHEETS—SHEET 4.

Attest
Edward N. Saxton

Inventor
George H. Stewart
By Spear, Middleton, Donaldson & Spear
attys

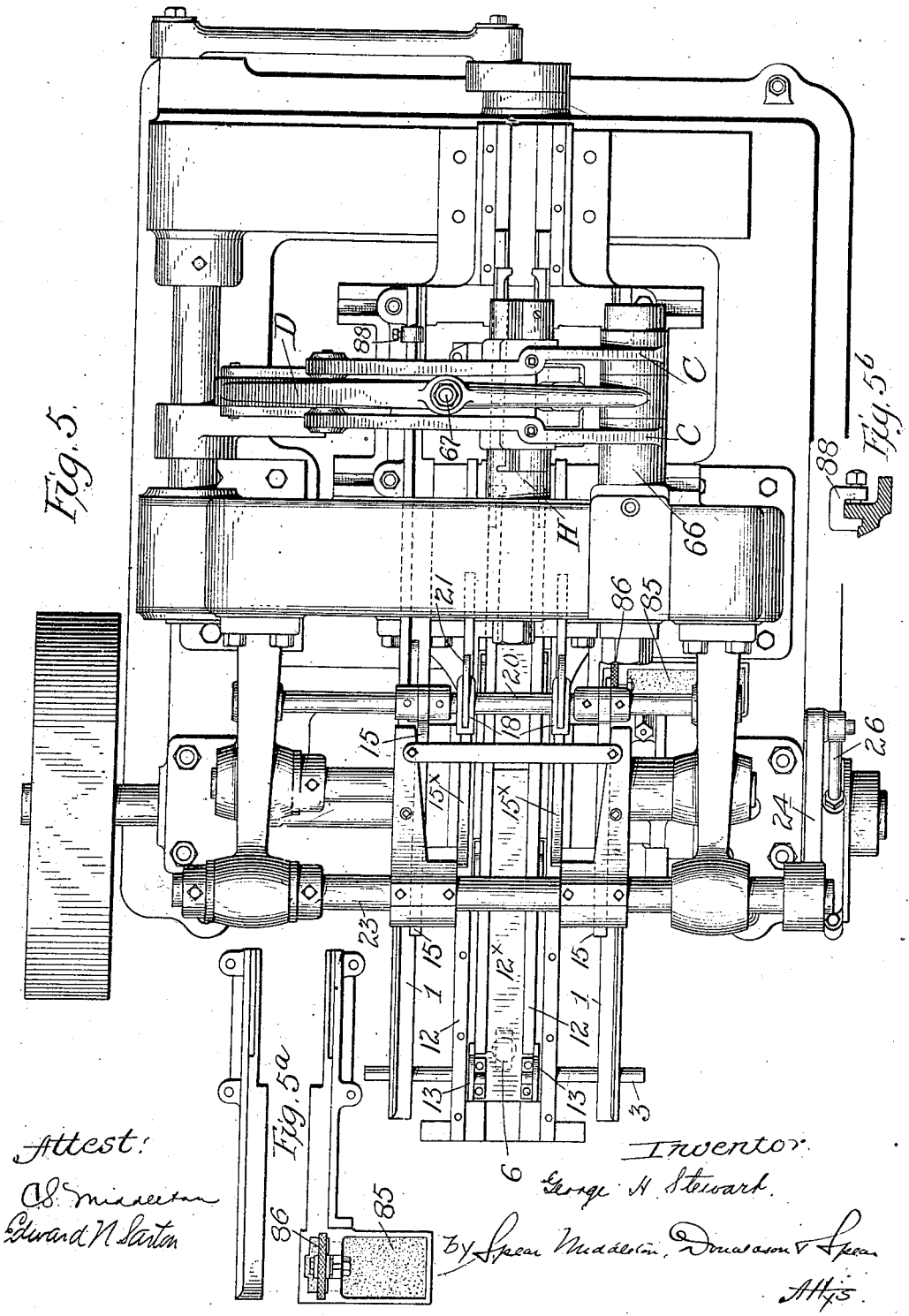

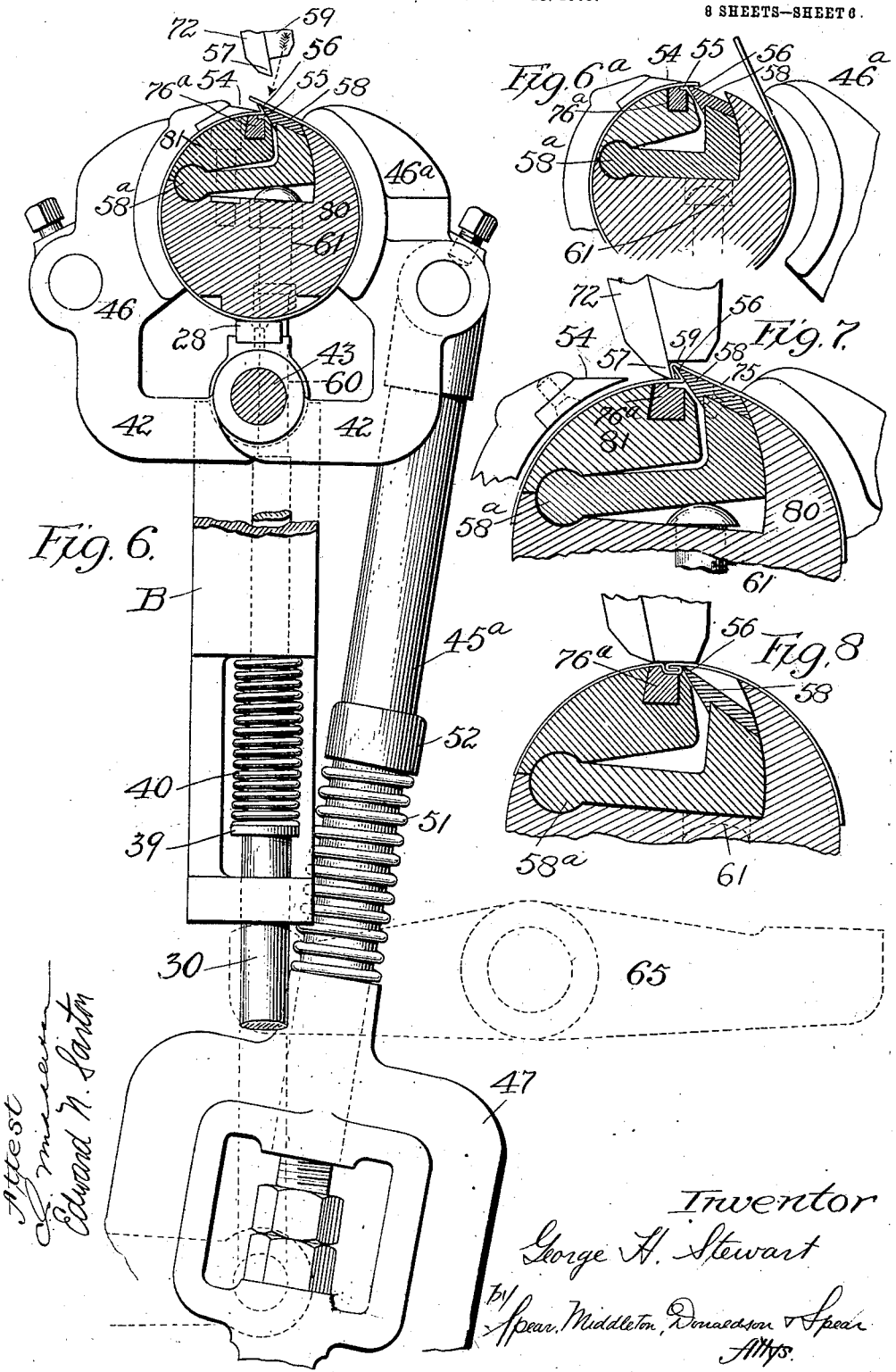

No. 837,008. PATENTED NOV. 27, 1906.
G. H. STEWART.
MACHINE FOR FORMING CAN BODIES.
APPLICATION FILED JULY 28, 1905.
8 SHEETS—SHEET 7.
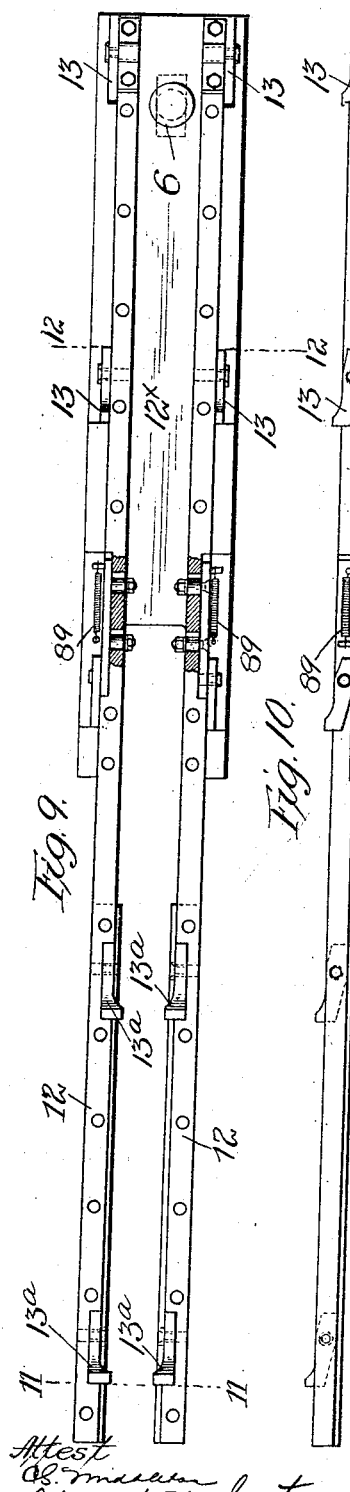
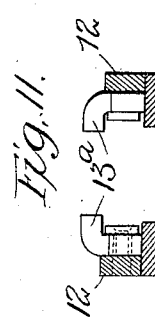
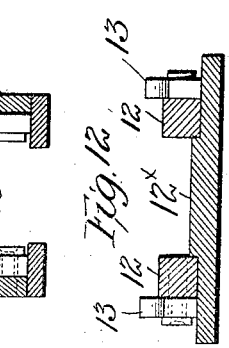
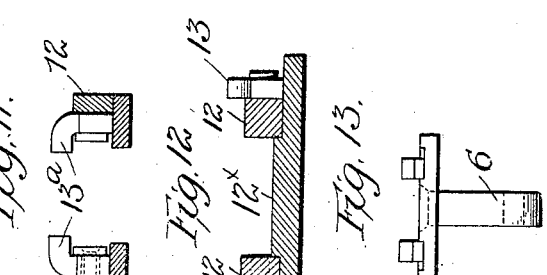
Inventor
George H. Stewart
By Spear, Middleton, Donaldson & Spear
Attys
Attest
C. S. Maclean
Edward N. Sarton No. 837,008. PATENTED NOV. 27, 1906.
G. H. STEWART.
MACHINE FOR FORMING CAN BODIES.
APPLICATION FILED JULY 28, 1905.
8 SHEETS—SHEET 8.
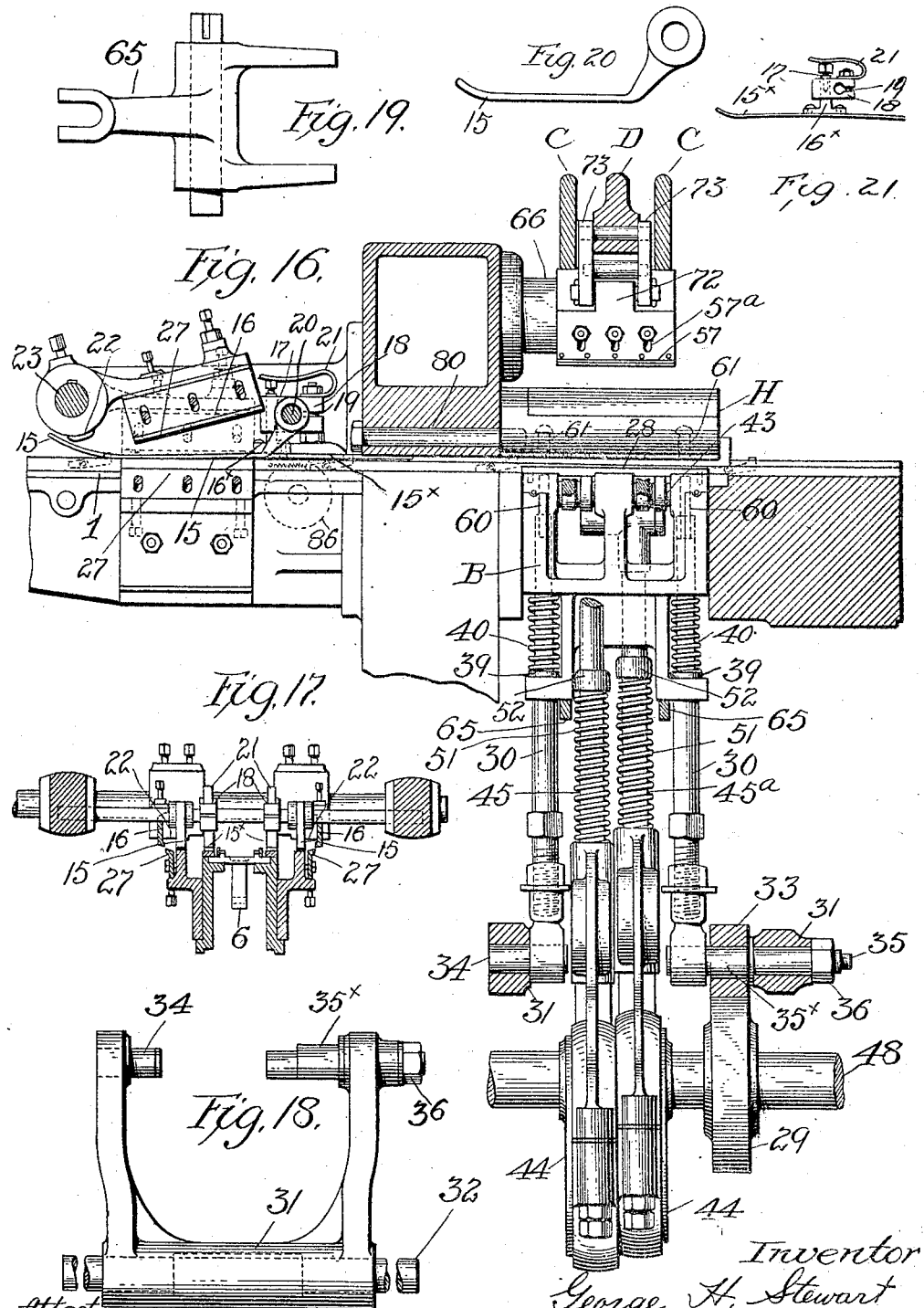
Inventor
George H. Stewart
By Spear, Middleton, Donaldson & Spear
Attys.
Attest

UNITED STATES PATENT OFFICE.

GEORGE H. STEWART, OF LOS ANGELES, CALIFORNIA.

MACHINE FOR FORMING CAN-BODIES.

No. 837,008.          Specification of Letters Patent.          Patented Nov. 27, 1906.

Application filed July 28, 1905. Serial No. 271,690.

*To all whom it may concern:*

Be it known that I, GEORGE H. STEWART, a citizen of the United States, residing at Los Angeles, California, have invented certain new and useful Improvements in Machines for Forming Can-Bodies, of which the following is a specification.

The machine in which my present invention is embodied is intended for the formation of the bodies of sheet-metal cans, and particularly cans of that class in which the side seam is formed by the interlocking edges of the body-blank.

My invention relates more specially to the following parts: first, mechanism for shearing the body-blank, and thereby giving it accurate shape and dimensions as it is fed to the body-former, thus insuring not only accuracy in respect of size, but also accuracy of presentation of the blank to the former. The second part relates to the former itself. The features on this are simplicity of parts and structure and (what is of more importance) a construction which will work with certainty and accuracy and produce bodies of uniform diameter in all the cans and in each throughout its entire length. The construction also permits access to the machine for easy and accurate adjustment.

My invention is illustrated in the accompanying drawings, in which—

Figure 1:
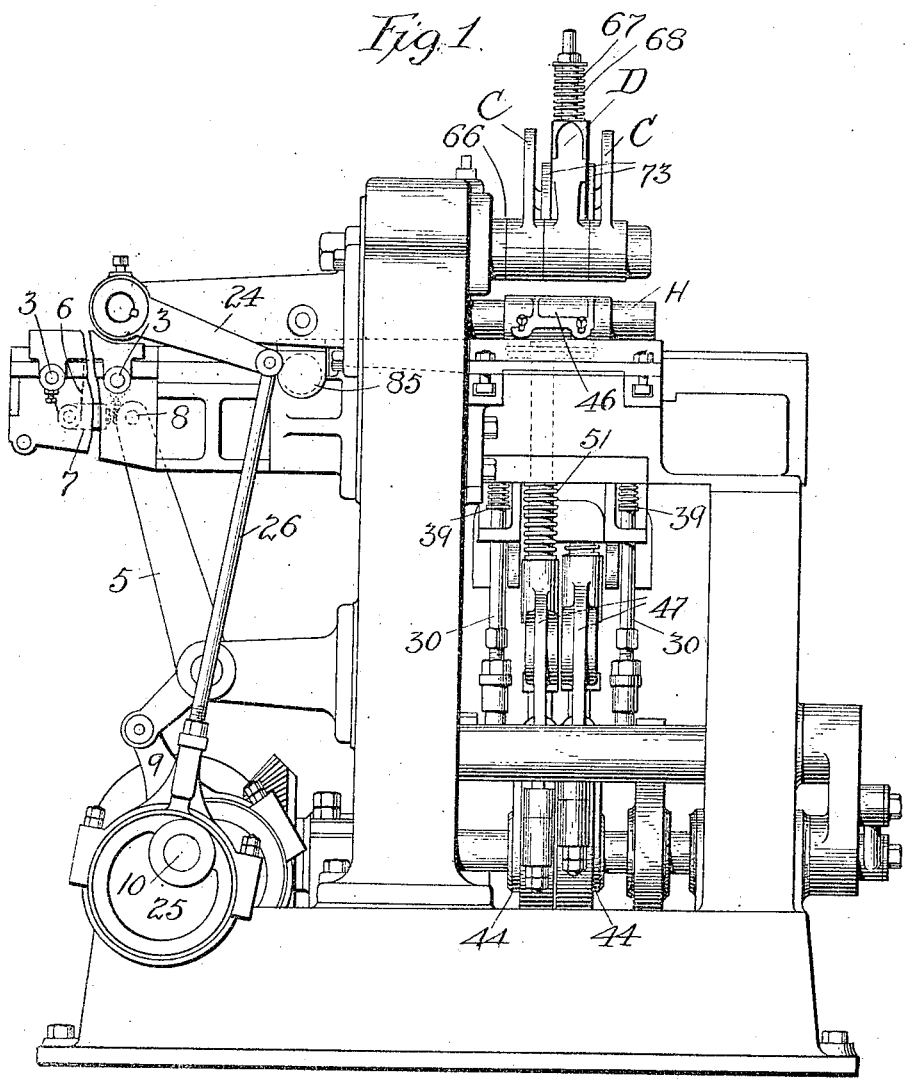
Figure 2:
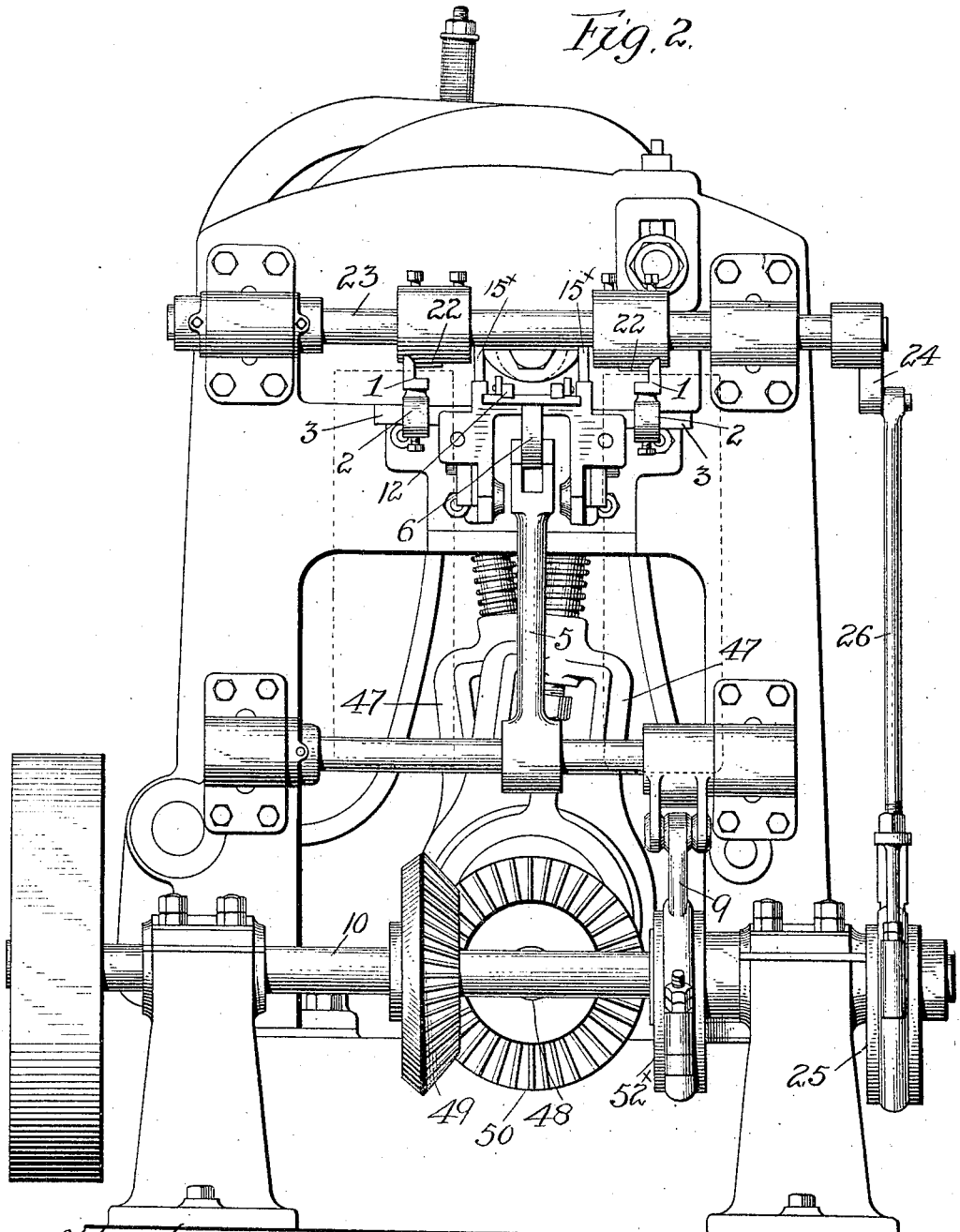
Figure 3:
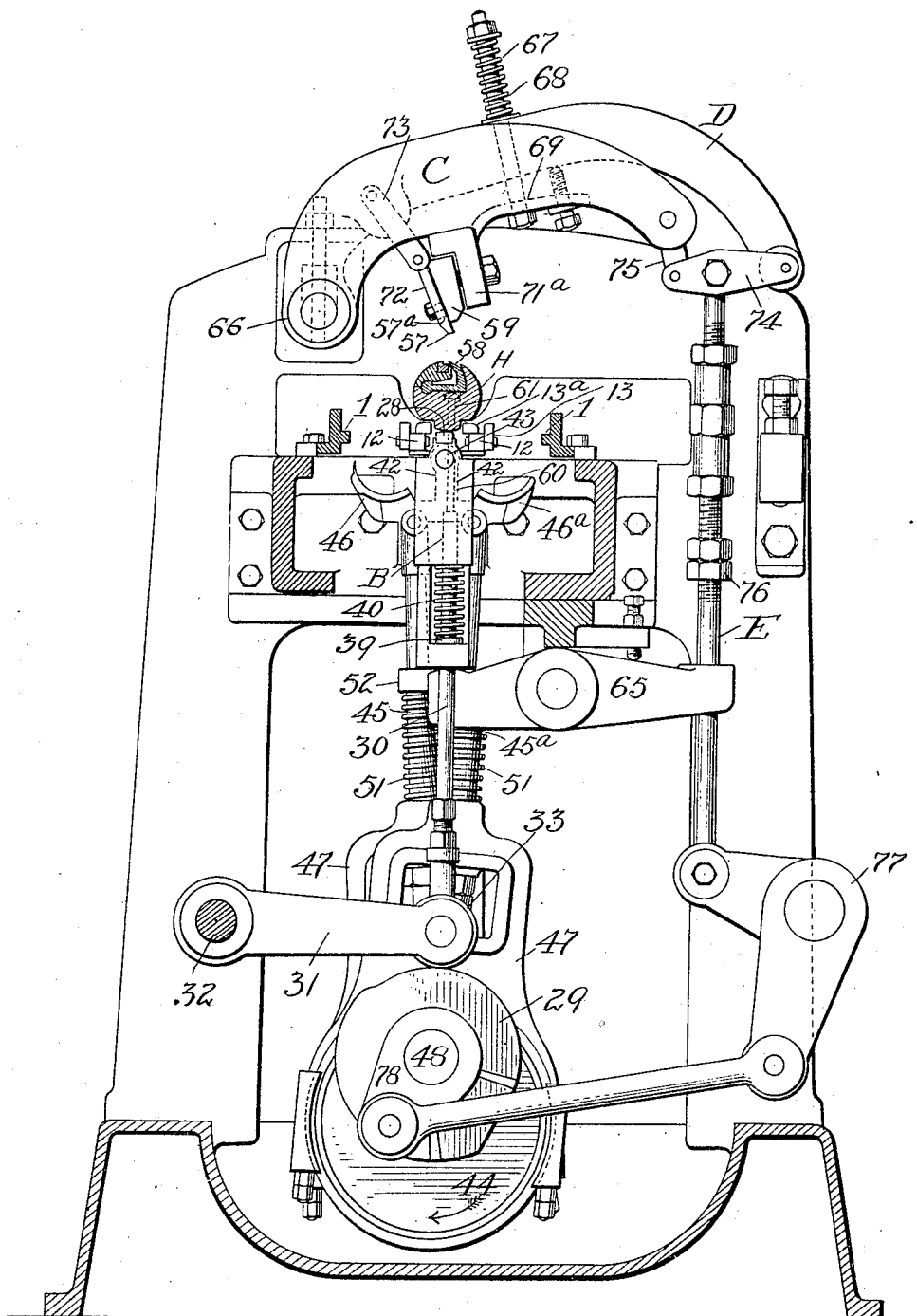
Figure 4:
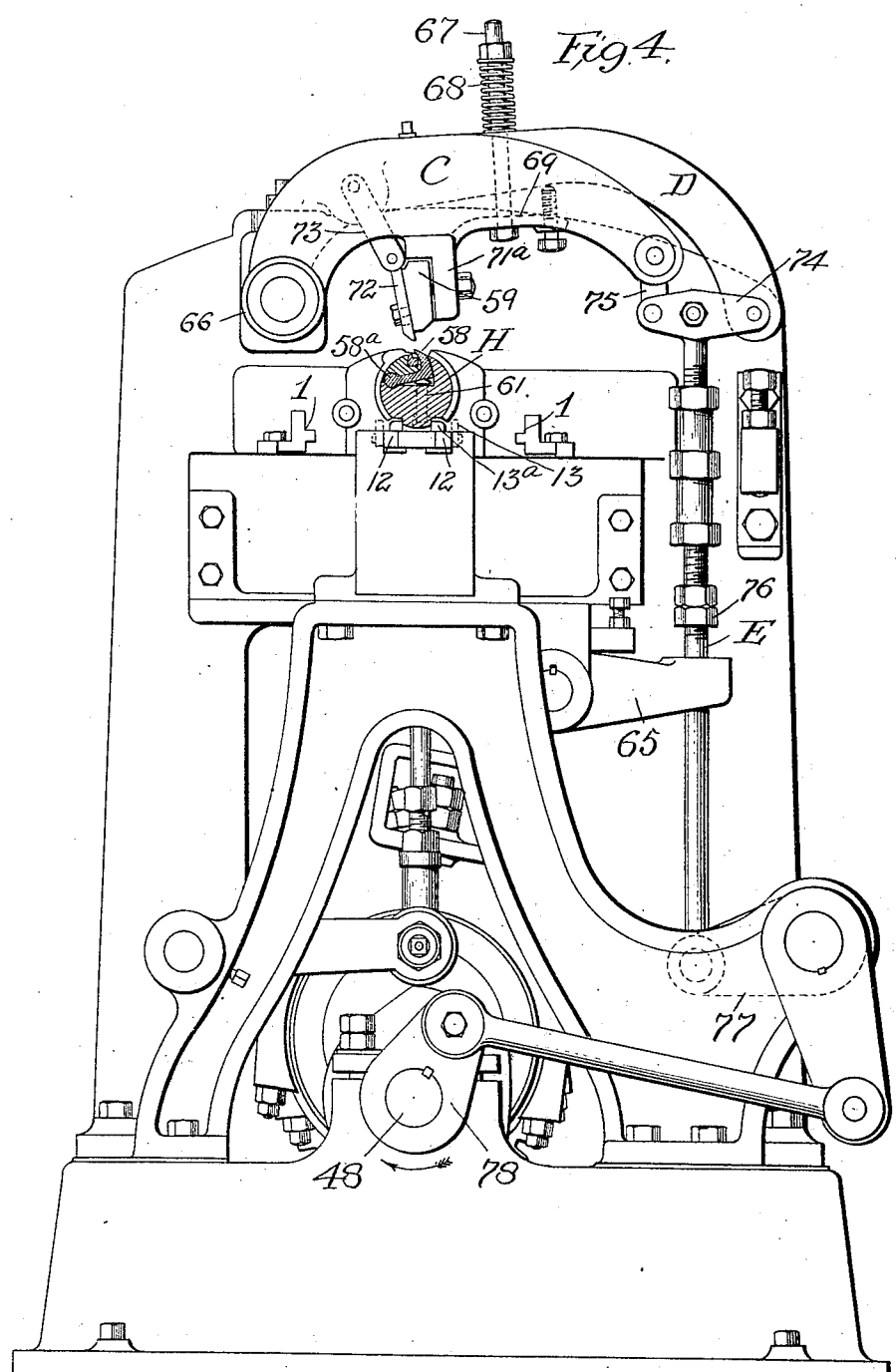

Figure 1 is a side elevation of the machine. Fig. 2 shows a front end elevation. Fig. 3 shows a rear end elevation, partly in transverse vertical section, through the horn with the wiping-jaws open. Fig. 4 represents a similar view with the jaws closed. Fig. 5 shows a top view of the machine. Fig. 5ª shows a detail hereinafter described. Fig. 5ᵇ is a detailed view of one of a pair of stops. Figs. 6 and 6ª show details of the horn with the immediate coacting elements. Figs. 7 and 8 are details, on still larger scale, illustrating the operation of the machine in forming the seam. Figs. 9 and 10 show in plan and side elevation details of the feeding devices for the blanks. Figs. 11 and 12 show cross-sections on lines indicated by the numerals 11 11 and 12 12, Fig. 9. Fig. 13 shows a detail hereinafter described. Figs. 14 and 15 further illustrate the horn. Fig. 16 is a detail view showing in side elevation the shears on the near side of the machine and the clamps associated therewith and showing in side elevation the horn and adjacent devices with their operating means, parts, however, being shown in section. Fig. 17 is a transverse sectional view at a point adjacent the shears. Figs. 18 and 19 are views of operating-levers. Fig. 20 is a detail view of a clamp. Fig. 21 is a detailed view of another clamp.

I will first describe the feeding and trimming mechanism.

A serious difficulty in the formation of can-bodies arises from defects in the formation or presentation of the blank to the former if the ends of the blank are not cut at an exact right angle to the sides, or if in the presentation of these blanks to the horn one side is in advance of the other, or if the blank (perfect in form and position in other respects) is located too much to one side or the other, imperfect work at the seam will be done and material defects will arise either in the diameter of the can-body or in the evenness of the ends. To prevent these defects, I have combined with the feeding and clamping devices shearing devices, which operate in front of and in line with the horn, whereby the ends of the blank (by which I mean those edges which form the side seam) are cut, while the blank is held in front of the horn, so that it requires undisturbed forward movement only in order to get into position for the folding-jaws and horn to operate upon it. I thus reduce to a minimum or eliminate altogether the otherwise too frequent distortions and imperfections arising from defects in shape or presentation of the body-blanks.

The clamps in front of the horn hold the blank while the knives shear the ends. Then the feeding devices push the blank under the horn. As soon as the blank is under the horn it is clamped thereunder and is in position and shape to be accurately operated upon by the jaws and seam-forming mechanisms.

The blanks, cut accurately parallel on their front and rear edges, (forming the ends of the body,) but not cut to exact size on their ends, are entered upon the ways 1, Fig. 5. These ways are formed of flanges on the longitudinal bars fixed upon the frame of the machine. These ways support the ends of the blanks and the blanks move upon them. Between these fixed ways are movable bars 12, Figs. 9 and 10, parallel thereto, which also support the blanks on interior lines, and being provided with dogs to engage the front edges of the blanks reciprocate to feed them to the shears. It will be understood that these reciprocating bars are supported on parts of the frame suitably formed to accurately guide them. The outside guiding supporting-bars are shown in Figs. 2 and 3 in place. Fig. 2 shows an end view with lugs 2 depending from the bars, forming ears through which cross-rods 3 extend to connect them. There are two of these cross-rods, as shown in Fig. 1. In Fig. 3 is shown a cross-section taken through the horn and adjacent parts at the right of Fig. 1, with some of the parts shown in elevation.

The interior reciprocating bars 12 are connected by the cross-web $12^\times$ and are operated as one frame by means of a bell-crank lever 5, Fig. 1, to the long arm of which the bar-frame is connected by a lug 6 and link 7, having the connecting-pivot at 8. The short arm of the lever is pivoted to an arm 9, strapped to an eccentric $52^\times$ on the main shaft 10, as in Fig. 2. The connecting-lug 6 is shown in Figs. 5, 9, and 10. The link is adjustable to accurately position the bars.

On their front parts the bars carry yielding dogs 13, pivoted on the sides thereof and extending when free above the upper surfaces of the bars. The dogs when drawn forward yield to pass under the blanks, but when pushed back engage the front edges of the blanks at two considerably-separated points and push evenly to feed back the blanks step by step according to the amount of reciprocation, the stopping-point of which is adjusted to suit that dimension of the blank which is taken longitudinally of the machine.

The first feeding movement takes the blanks in plain sheet form to the shears, which are located in line with the ways, and so as to cut the blanks to accurate length. As it advances under these the ends of the blank pass under spring-clamps 15, located just within the shears, the upper blades of which, 16, are indicated in Fig. 16 and both upper and lower in Fig. 17. The spring-clamps normally press down, yielding sufficiently to allow the blanks to enter beneath them and clamping them upon the way, as indicated in Fig. 17, which shows the relation of the parts, but on a reduced scale. Other spring-clamps $15^\times$ are employed nearer the center line of the machine, Figs. 2, 5, and 17.

Each spring-clamp $15^\times$ is bolted to the foot $16^\times$ of a pin 17, which is carried loose in a block 18, split and clamped by bolt 19 on a rod 20, fixed in the frame of the machine. Fig. 17 shows the right-hand ends of these blocks in elevation. A spring 21, clamped under the nut of bolt 19, bears on the head of each of the loose pins 17, and thus presses down the spring-clamps $15^\times$. The clamps 15 are curved upward at their ends in range of lugs 22 on the hubs of the knife-arms. These hubs are set on the shaft 23, which carries an arm 24, operated by an eccentric 25 on the shaft 10 through a rod 26, strapped to said eccentric.

In the progress of each clamp it is pushed under the spring-clamps, the parts being so adjusted that the movable blades are at that instant raised. These blades, however, are brought down in proper succession of movement, the eccentric being so set as to give a faster initial movement and slower and more powerful as the blade enters upon its work; but the lugs 22 are so set that just prior to the cutting they bear upon the spring-clamps and give a final and stronger grip upon the blank at the instant of shearing.

The lower blades 27 are set adjustably on the frame, in inside position, and the upper, also adjustably set, are on the blade-arms in outside position. The blank thus firmly held just in front of the body-forming devices is sheared at the ends, and thus receives its final and accurate form and dimensions and by further movement of the dog-slide is pushed into place beneath the horn H, where all the operations are performed, with the exception of the soldering, for completion of the can-body.

It will be understood that the extra pressure on the blank caused by the lugs 22 ceases with the rise of the blade, and the blank, in accurate alinement, passes under normal pressure of the clamps and by further movement of the dogs, without possibility of disarrangement in the slightest degree, to its proper position for the completion of the work.

The horn H, constructed as hereinafter more particularly described, is located in line with and just above the plane of the guideways for the blanks, in the clear space above the upper surface of the frame of the machine and above the wiping-jaws and all their operating mechanisms.

Before the blanks are located under the horn it is necessary to apply the flux thereto. For this purpose I locate between the shears and the horn, on the under side and in position to apply properly the flux at the right-hand end of the blank, a fluxing tank and roller. This is shown in Fig. $5^a$, which shows a part of the way carrying the blanks, and the fluxing-tank 85 attached to the way, and a fluxing-roller of porous material 86 carried in suitable bearings. The roller in the usual manner takes up the flux and applies it to the blank as the latter passes over the roller and in contact therewith. The combined action of the feeding devices, pressure-clamps, and roller is such as to rub the flux on the blank in proper position during its passage.

I have aimed constantly to have the operating parts of my machine as far as possible in view and easily accessible, and the shearing and fluxing devices are so located.

The movements of the feeding devices are necessary in order to convey the blanks underneath the frame from the shears to the horn; but these movements are in a direct line, and the blanks so moved are not subjected to any disturbing influence.

As soon as the blank is in position under the horn it is clamped upon the horn by a clamp 28, extending longitudinally of the horn and directly underneath, so as to engage the central part of the blank. An end view of this clamp is shown more plainly in Fig. 6. This clamp is fixed by screws in a groove in the upper end of a frame B, an end view of which is shown in the same figure and a side view in Fig. 16. This frame reciprocates vertically in suitable guides and is operated by a cam 29 on the shaft 48. Vertical rods 30, one in each end of the frame, are adjustably connected to pins in a pivoted yoke 31. The yoke rocks on a pivot 32, set in the frame of the machine. It gets its motion from the cam through a friction-roller 33. The connecting-pin 34 is fixed in the arm of the yoke; but the pin 35 in the other arm is clamped adjustably on the arm and has an intermediate eccentric shank $35^\times$, on which the roller 33 turns and which by loosening the nut 36 may be set to adjust accurately the throw of the frame. The cam does not operate positively upon the frame, but through springs 40, one on each of the two rods. This allows yielding movement as strong as required and proportioned by the strength of the springs and the amount of movement. This single frame and its impelling devices coact in the various and otherwise complicated motions required in wrapping the blank upon the horn, folding the edges, and forming the interlocked seam. The first movement is effected by the lower part of the cam. This operates upon the roller or arm 31, lifts the yoke and the two rods 30, with the collars 39 fixed thereon and supporting the springs 40 thereon, and through the springs bearing at their upper ends on a cross-bar of the frame lifts the frame and brings the clamp-piece 28 to press the blank firmly against the under side of the horn; but the wiping-wings 46 $46^a$ are also pivoted on this frame, as shown in Figs. 3 and 6, these wings being carried on arms 42. (Shown in Fig. 6.) Their inner ends are pivoted on a pin 43 in the upper end of the frame. When out of action, the wings are down and out of the way. The first movement of the frame clamps the blank and begins to raise the wings, bringing their pivoting-fulcrum approximately into place and far enough to render effective their subsequent action. The further action of the frame will be described after that of the wiping-wings. These are given a larger movement in order to envelop the blank placed on the horn. These wings require for the best effect a quicker initial and a slower and stronger final movement, and this I effect by means of an eccentric 44, Figs. 1, 3, and 16, operating both wings. Since one wing must move in advance of the other, though both to the same extent, I connect them independently to the same eccentric by means of rods 45 $45^a$, which at their upper ends are pivoted 45 to the advance wing 46 and $45^a$ to the following wing $46^a$.

The rods 45 $45^a$ are connected loosely with limiting-nuts, as shown in Fig. 2, to yokes 47, strapped to the eccentric. The eccentric is on the same shaft 48 with the cam 29 and is driven through bevel-gears 49 50 from the main driving-shaft 10, which carries also the blank-feeding eccentric and that for the shears. The rods 45 $45^a$ diverge from these eccentrics to their respective wings, the rod 45 being connected so as first to be operated upon. Motion is imparted through springs 51, bearing at their lower ends on the yokes and at their upper against collars 52 on the rods.

Assuming that the wing-pivot 43 has been raised and that the wings are fulcrumed thereon in the first working position, the wings will be in position a little above that shown in Fig. 3 and the eccentric moving in the direction of the arrow, Fig. 3, will first swing the wing 46 and bring it first against the blank supposed to be lying clamped on the horn and with its ends on the guideways 1 1. The wings finally swing up in proper succession to a position shown in Fig. 6. Their motion at first is a lifting and swinging-in motion; but finally they clamp upon the blank and horn on approximately opposite sides, but with some upward movement even to the close, the final pressure becoming stronger as the intermediate springs close. The wings conform to the shape of the horn, but differ in extent of reach and forward edge. The wing 46 has a further extension in the form of a supplemental hardened-steel edge 54. Its extent and shape are such that when the wing is fully closed it will wipe the blank on that side quite down upon the horn with its end extended over the seam-groove 55 in the horn in the position indicated in Fig. $6^a$. It will be understood that the wing 46 holds the blank firmly down in the position mentioned, and in immediate succession the folding edge 56 of the under folder 58 rises and strikes the under side of the blank just outside of the position of the turning edge of piece 54 and bends it up into the position shown in Fig. 6. It will be understood that their movements follow in rapid succession and with steadily-applied though quick pressure caused by the eccentric and the intervening springs. Immediately following the turning up of the edge of the first applied end of the blank the wing $46^a$ wipes on the other end and lays it over the first, as shown in Fig. 6, the end resting upon and extending over the fold first made.

It will be observed that the wing 46ª does not extend to the edge of the blank, which overlies and extends beyond the hardened-steel edge 56 of the underfolder, this edge now remaining in place and held firmly. The upper folding edge 57 now descends obliquely to the blank end and bends it over the overhanging edge 56 of the lower folder slightly beneath said edge 56 and over the upturned edge of the other end of the blank into the position shown in Fig. 7. At this instant the edge of wing 46 retreats. The wing 46 therefore does not begin to retreat until the folder 57 has practically completed its work. Following this instantly is the action of the seam-closer 59. These movements and their order and effect will be better understood from a description of the operating mechanism therefor.

Recurring to the frame B and the parts moving it and carried by it, it has been described as first lifting the clamp and the pivot of the wings. The cam 29 continues throughout its low part the pressure upon the clamp, which is also continued and increased when the high part comes into action. The further effect of this is to force upward farther the rods 30 and to raise the extensions 60 thereof, which are in line with strike-pins 61, loose in guide-holes within the horn. There are two of these pins, one at each end of the lower folder, as shown in Fig. 16, one being shown more plainly in Fig. 6. Their upper ends are headed to limit the drop, and they bear on each end of the under folder, and thus apply the force equally to avoid the defect of the former twisting action. This folder consists of a plate pivoted on one edge at 58ª within the horn. The free edge is turned up and carries the hardened-steel edge 56, arranged to project through a longitudinal slot in the upper surface of the horn. The cam is so shaped and set that it will cause the pins to raise the edge and bend the fold of the blank edge first laid over the edge 54 immediately upon its arrival at the proper point and immediately before the arrival of the other end of the blank. The force of the uplift caused by the cam is sufficient to bend the tin and form this first fold. The high part of the cam is also of sufficient length to hold the lower folding edge 56 in place, so that it serves as an anvil over which the outer top of the blank is bent. The edge 54 of the advance wing is retained after it has so served for the first fold for the purpose of assisting in the further formation of the folds, and the parts being in this position—that is to say, the outer end of the blank lying over the upturned edge of the inner, the edge of 54 being in place, and the edge 56 in place—the parts are in position for the action of the upper folder and seam-closer to be brought down to complete the folding and close the seam.

The upper folding and the seam-closing devices are carried on levers C and D, both on the same pivot, on one side of the frame and lying side by side, but of unequal length, as shown in Fig. 3.

It will be observed that the construction of the body-forming parts hereinbefore described leaves these parts when not in action below the plane of the surface of the upper side of the horn, and when they are in action they rise a little above this surface, and their working is exposed clearly to view, so that the working of the parts can be seen in adjusting the machine and whenever it is necessary to observe closely its working. In furtherance of this object I have curved upward the levers C and D and provided for an extended upward limit of movement of the upper folder and seam-closer, so as to leave an ample clear space about the working parts of the body-former.

The levers C and D are more clearly shown in Figs. 3 and 5 and in cross-section in Fig. 16. Lever C is double, and D is a single lever located between the parts of C, but both pivoted on the same arm 66, bearing in the frame. They are yieldingly connected by means of a bolt 67 passing loosely through lever D, extending upward and having on its extended end a spring 68, held between the upper surface of the lever and a nut on the end of the bolt. The lower end of the bolt is attached to a cross-piece 69, fixed to and connecting the two parts of the lever C. The lever C carries the seam-closer 59, which performs the function (though in a different manner) of the ordinary so-called "hammer." It is bolted to a bridge-piece 71ª, fixed to the two parts of the lever. It has a working face, as shown, and an inclined side against which rests the upper folder 72, having the edge 57, Figs. 3 and 16. This has slots 57ª, through which pass the holding-screws, so that the folder may move to a limited extent in relation to the seam-closer. The folder is linked to the lever D by links 73. The levers are further connected to each other by means of double links 74, one end of which embraces and is pivoted to the central lever D, and the other is attached to the double lever by a supplemental link 75. To the link 74 is connected an adjustable rod E, carrying an adjustable collar 76, and at its lower end connected to an arm of a bell-crank lever 77, pivoted on the frame. The other end of the bell-crank lever is connected to the wrist-pin of a crank 78 on the shaft 48, which carries the cam operating the under folder. The crank is so set on the shaft in relation to the cam that it will operate the levers C and D and the upper folder and seam-closer while the high part of the cam is still holding up the under folder in order that its edge may act as an anvil for the upper folder. It will be observed that the rod E is connected with the links 74 at a point near to the connected end of the lever C and, further, that this connection is flexible. This causes the parts to operate without shock and in proper order and with the easy and sensitive movement of the skilled hand. The position of the connection of the rod E on the link balances the pull on the unequal levers, and the first effect is to pull both down equally.

The position of the approaching parts to the overlapping edge of the blank is shown in Fig. 6. The upper folder edge is in advance of the seam-closer. The movement of both is in the arc of a circle; but the folder is inclined, as shown. Therefore the folder edge moves upon the tin in a downward and lateral direction and with a rubbing movement, and as it presses upon the unsupported part of the blank, extending beyond the edge of the lower folder, this extending portion yields under the pressure and is bent into the position shown in Fig. 7, and the upper folder edge advances to the position therein shown, where its movement is arrested by the outer end of arm D coming in contact with adjustable stop 76<sup>x</sup>, Figs. 3 and 4, attached to the frame of the machine. The object of this stop is to positively arrest the downward movement of arm D, which carries the folder 57, so that after it has made the fold no further pressure can cause it to dent or cut into or cut through the tin which lies underneath it. (See Fig. 7.) At that instant the under part of the blank with the folds above it lies extended over the seam-groove 55 in the face of a hardened-steel bar 76<sup>a</sup>, inserted in the horn and large enough to receive the folds of the seam. The seam-closer 59, continuing its movement permitted by its slotted connection with the folder and by its flexible connection with the lever carrying the folder, comes down in a similar circular path and impinges upon the crest of the fold shown as in Fig. 7 and rubbing toward the edge—that is to say, to the left of Fig. 7—until it reaches the position shown in Fig. 8. The wing 46 holds its end of the blank until the forming seam is caught by folder 72. The under folder is withdrawn into the horn as the seam-closer advances by reason of the roller 31 having reached the low part of the cam, which is shaped and set to time movements accurately.

The movements of the mechanisms are such as to hold the blank close upon the horn and there to crowd the edges of the blank together to form a close compact seam and to leave a smooth plain exterior surface.

The horn H is secured to a solid part of the cross-beam of the main frame by a bolt 80, Fig. 16, this beam also carrying the arm 66, on which the levers C and D are pivoted.

The horn has two grooves, rectangular in cross-section, Fig. 3, on the under side for the purpose of admitting the pushing-dogs, which engage and move the body after it is formed upon the horn. These dogs are of the same series as those hereinbefore described and are upon the same reciprocating bars, but are turned upward and inward and are shaped and located as shown at 13<sup>a</sup>, Figs. 9 and 11. They engage the front end of the can-body and push it from the horn.

Necessarily the horn is fixed to the frame at one end only and offers not the same solid resistance to the pressure of the folding and seam-closing devices throughout its length. The yielding liable to occur at the unsupported end will tend to cause inequality in the seam and distortion of the can. To prevent this and to give equal and firm support to all parts of the horn when under pressure, I apply extra support during the operation of the seam-closing device, and, further, I accomplish this through the clamp which holds the blank upon the horn. For this purpose I pivot on the main frame a forked lever 65, Figs. 13 and 19, the forked end of which extends under the frame B and bears equally on both ends of the lower surface thereof. The other end embraces the pull-down rod E, which operates the upper folder and the seam-closer. The rod carries an adjustable collar 76, so adjusted that just when the seam-closer is in operation the forked end is brought up with force against the frame, forcing and holding it, with the clamp 28 on the upper end of the frame, against the under part of the horn, thus insuring equal and firm support thereto and insuring thereby equality on the seam and symmetry in the can-body. It will be observed that this pressure, though applied, like that exerted upon the folder in the horn, equally throughout its length and for the same main object of obtaining a symmetrical seam and symmetrical can-body, is quite distinct in its operation and mechanism from that exerted upon the lower folder and no less important. The extra pressure is exerted after the folders have completed their work and within the space lying between the pressure devices which act upon the lower folder. These, it will be noted, when not in action leave a clear path for the entrance of the blank. The pins 61 are upheld by their heads and never protrude below the horn-surface, and the extensions 60, which operate the pins, retire below the path of the blank and rise only after the blank is in place between them and is clamped on the horn. The accurate position of the blank in this relation is determined by fixed stops 88, Fig. 5, adjustably set on each way and so as to arrest the blank at precisely the proper place in relation to the horn. The blank being here folded on the horn, the formed body rides above these stops. The set of dogs which pushes the blanks against these stops has springs, as shown at 89, Fig. 9, so arranged that these dogs crowd the blanks against the stops until the clamp operates, and they insure accuracy of position. This clamp, it will be understood, serves both to hold the blank and afford support for the horn, and this it most strongly effects through the extra pressure hereinafter described. The arrangement is such, by reason of the connection of the forked lever 65 with the pull-down rod E of the upper folder and the seam-closer, that the two oppositely-acting parts—to wit, the seam-closer and clamp 28—operated by the same power act like jaws and cause no strain upon the horn.

The necessity of loosening the body after it is formed upon the horn, in order to readily remove it, has given rise to collapsible horns, with their objectionable features. In the horn which I have invented this difficulty is obviated by the special construction of the lower folder and parts of the horn about the folder-cavity. The horn is practically solid. It is conveniently made in two parts 80 and 81, leaving space for the folder and the arm and its pivot, which rests in a groove formed in the two parts. That part of this cavity which opens into the slot is made broad, and the lower folder-blade when projected extends its upper inclined face so that on this side it is flush with the abutting edge of the horn-surface, and the surface extends to the folding edge, which is above the contour of the horn itself, but forms prior to the completion of the seam part of the contour. When, therefore, the lower folder retreats and the tin folds are forced down to finish the seam, the can-body is slightly loosened by reason of the reduction of the circumference of the horn, due to the retreat of the protruding edge of the folder. This loosening is distributed over the horn by reason of the retreat of the wings and clamp 28, and immediately upon the completion of the seam the can is loosened and is ready for the dogs, which at once push it from the horn.

The amount of the collapse due to the retreat of the folder may be adjusted to some extent by varying its projection by adjustment of the moving mechanism hereinbefore described.

I claim as the form and combination, substantially as described—

1. In combination, in a can-body-forming machine, the feeding and shearing mechanism, spring-clamps of leaf form arranged to engage the blanks and to permit feeding of the same thereunder, and a supplemental pressure device independent of said spring-clamp and operated in conjunction with the shears to apply additional pressure during the shearing operation, said supplemental pressure device also being in the form of a leaf-spring, substantially as described.

2. In a can-body-forming machine, body-forming mechanism, feed-bars carrying dogs, reciprocating mechanism therefor, shears for cutting the blanks to accurate dimensions, said shears having fixed and movable blades on each side of the path of the blanks, spring-clamps and studs on a part of the movable shear-blades engaging the said spring-clamps as the blades perform their cutting action, said clamps thus exerting a minimum controlling pressure on the blanks when they are being fed and a maximum holding pressure while the blanks are being cut, substantially as described.

3. In combination in a can-body-forming machine, body-forming mechanism, feeding mechanism, shearing mechanism located in advance of the body-forming mechanism comprising pivotally-supported shear-blades, fixed shear-blades, spring-clamps, and means at the pivoted ends of the shears for pressing on said clamps to exert pressure on the material while being sheared, said clamps thus exerting a minimum controlling pressure on the blanks when they are being fed and a maximum holding pressure while the blanks are being cut, substantially as described.

4. In a can-body-forming machine, a horn, a lower folder arranged therein, folding-wings, means for operating said wings, means for operating said lower folder, one of said wings coöperating with the lower folder to make the first fold in the blank, substantially as described.

5. In a can-body-forming machine, a horn, a lower folder within the horn, folding-wings, means for operating the folding-wings, means for bending the blank about the horn, and means for operating the lower folder, said lower folder coöperating with one of the wings to make the first fold, and means coöperating with the said lower folder when projected to make the second fold, substantially as described.

6. In a can-body-forming machine, a horn, a lower folder within the horn, folding-wings, means for operating the folding-wings for bending the blank about the horn, and means for operating the lower folder, said lower folder coöperating with one of the wings to make the first fold, and means coöperating with the said lower folder to complete the seam, said coöperating means comprising an upper folder and a seam-closer, the former of which makes the second fold, while the lower folder remains projected and the latter of which upon the receding of said under folder advances to complete the seam, substantially as described.

7. In a can-body-forming machine, a folder-blade in the horn formed with an edge adapted to project through a slot in the horn, and a wiping-wing arranged to coact with the folder-blade, to form the first fold, said folder bending the end of the blank over the edge of the wing after the wing arrives in its holding position against the horn.

8. In a can-body-forming machine, a folder-blade formed with an edge adapted to project through a slot in the horn and to present a surface which is substantially a continuation of that of the horn, a wiping-wing first acting to wipe on the first or underlying end of the blank and coacting with the folder to form a fold on said end, a second wiping-wing next acting to wipe on the other end of the blank, and an upper folder arranged to form the fold in said other end of the blank on that first made.

9. In a can-body-forming machine, a folder-blade formed with an edge adapted to project through a slot in the horn and to present a surface which is substantially a continuation of that of the horn, a wiping-wing first acting to wipe on the first or underlying end of the blank and coacting with the folder to form a fold on said end, a second wiping-wing next acting to wipe on the other end of the blank, an upper folder arranged to form the fold in said other end of the blank on that first made, and a seam-closer acting finally to close the seam.

10. In a can-body-forming machine, a horn, means for folding the underlying end of the blank independently of upper folding means, and an upper folder arranged to fold the overlying sheet on a part of said means, combined with a seam-closer, operating in connection with the folder last named.

11. In a can-body-forming machine, the horn, means for folding the underlying end of the blank, and an upper folder combined with a seam-closer, yieldingly connected thereto, and coöperating with the horn and under folder to complete the seam.

12. In combination with the horn and means for folding the underlying end of the blank, and supporting the overlying end of said blank, an upper folder and seam-closer, carried on separate but yieldingly-connected parts.

13. In combination with the horn, and means for folding the underlying end of the blank, and supporting the overlying end of said blank, an upper folder and seam-closer, carried on separate but yieldingly-connected parts, and said parts being flexibly connected to their operating mechanism.

14. In combination with the horn and its wiping and folding mechanism, a seam-closer carried on a lever, an upper folder carried on another lever, and having a limited movement in relation to said closer, and connections between said levers whereby they are moved and one is allowed movement independent of the other.

15. In combination with the horn and its wiping and folding mechanism, a seam-closer carried on a lever, an upper folder carried on another lever and having a limited movement on said closer, a yielding connection between said levers and a link between the free ends of said levers connected to the operating-rod.

16. In a can-body-forming machine, a solid horn having a cavity for the lower folder and means for operating said folder, a pair of wiping-wings, one of which is formed to coöperate with said folder in folding the underlying edge of the blank, said wings being operated through yielding mechanism operated by an eccentric.

17. In combination with the horn, the lower folder, the loose pins 61 in the horn for operating the lower folder, the rods operating said pins, yielding means operated by the rods for applying pressure to the horn, and means for operating the rods.

18. In combination with the horn, the folding-wings, folding devices, one operating within the horn and one operating externally thereto, a seam-closer operating externally to the horn, and carrying means therefor moving the said seam-closer in a curved path to close the seam with a rubbing movement, substantially as described.

19. In combination with the folding-wings, a seam-closer arranged to act on one side of the horn, means arranged to apply pressure to the opposite side of the horn when the seam-closer acts, said means comprising a lever and a rod for operating the seam-closer, said rod operating also the said lever, substantially as described.

20. In combination with the horn and mechanism for forming the can-body thereon, the ways and stops thereon to arrest the blank accurately under the horn, and reciprocating feeding mechanisms arranged to press the blank against said stops with a yielding pressure.

21. In combination with a horn, a bar or clamp arranged beneath the horn, a cam with means operated thereby for pressing the bar to the horn for clamping the blank thereto and a crank with connections to the said bar to act as a support for said bar and horn, substantially as described.

22. In combination, the horn, means for forming the can-body about the horn, a lower and an upper folder operating on the blank to interlock the edges after being formed about the horn, and a seam-closer external to the horn having a lateral wiping action in relation to the seam, after the folding has been completed, the seam being closed by said wiping action, substantially as described.

23. In combination, the horn, the under folder presenting an overhanging edge, and an upper folder operating at an inclination to turn the edge of the blank over and slightly beneath the said overhanging edge, and a seam closer acting independently of the folder and having a lateral wiping action on the seam substantially as described.

24. In combination, the horn, the under folder presenting an overhanging edge, and an upper folder operating to turn the edge of the blank over the said overhanging edge, and a seam-closer acting independently of the folder, said seam-closer being external to the horn and having a wiping action transversely of the seam, substantially as described.

25. In combination with the horn, means for forming the blanks about the horn, a clamp, resilient means for giving initial pressure to the clamp and means for giving a final unyielding pressure, said means acting on the said clamp to which the initial pressure has been applied, said resilient and unyielding-pressure means being independent of the forming means, substantially as described.

26. In combination, the horn having the under folder, the pins for operating said under folder, the rods for operating the pins, the clamp, and the springs on said rods for imparting pressure to the clamp, substantially as described.

27. In combination, a horn, a seam-closer, a folder arranged to yield in respect thereto, and a pivoted lever carrying the seam-closer and folder in the arc of a circle whereby the seam-closer will have lateral movement in respect to the seam, substantially as described.

28. In combination, a horn, means for forming the can-body about the same, folding means for the blanks, a seam-closer to operate on the folded portions of the blanks, means for applying a yielding pressure to the horn, and means for subsequently applying an unyielding pressure to the horn when the seam-closer operates on the seam, both the said yielding-pressure means and the unyielding-pressure means being independent of the forming means, substantially as described.

In testimony whereof I affix my signature in presence of two witnesses.

GEORGE H. STEWART.

Witnesses:
HENRY E. COOPER,
EDWARD N. SARTON.